June 28, 1949.   H. F. ALLEN   2,474,509
JIGGERING MACHINE FOR FORMING
ARTICLES OF PLASTIC CLAY Filed May 29, 1944   7 Sheets-Sheet 5

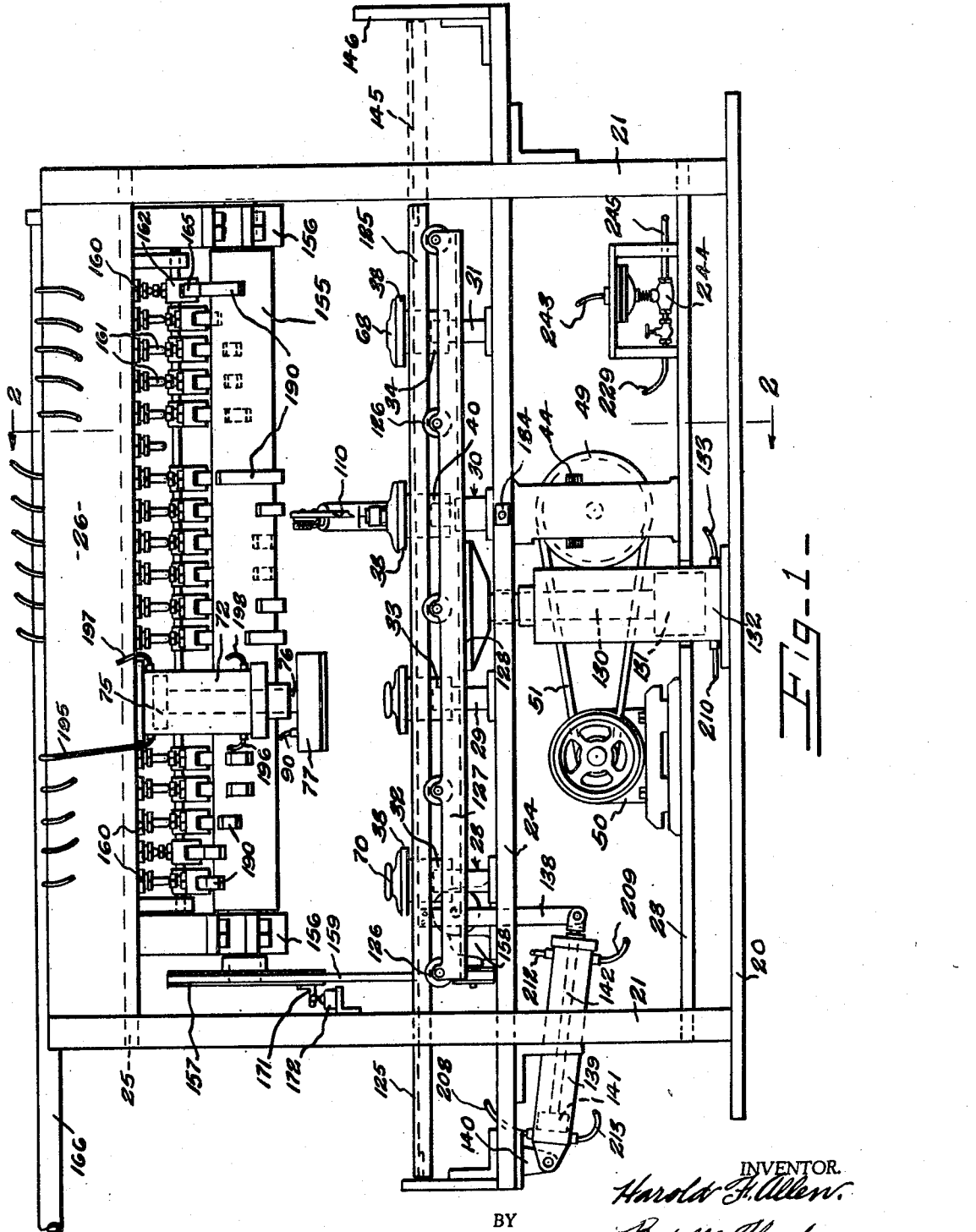

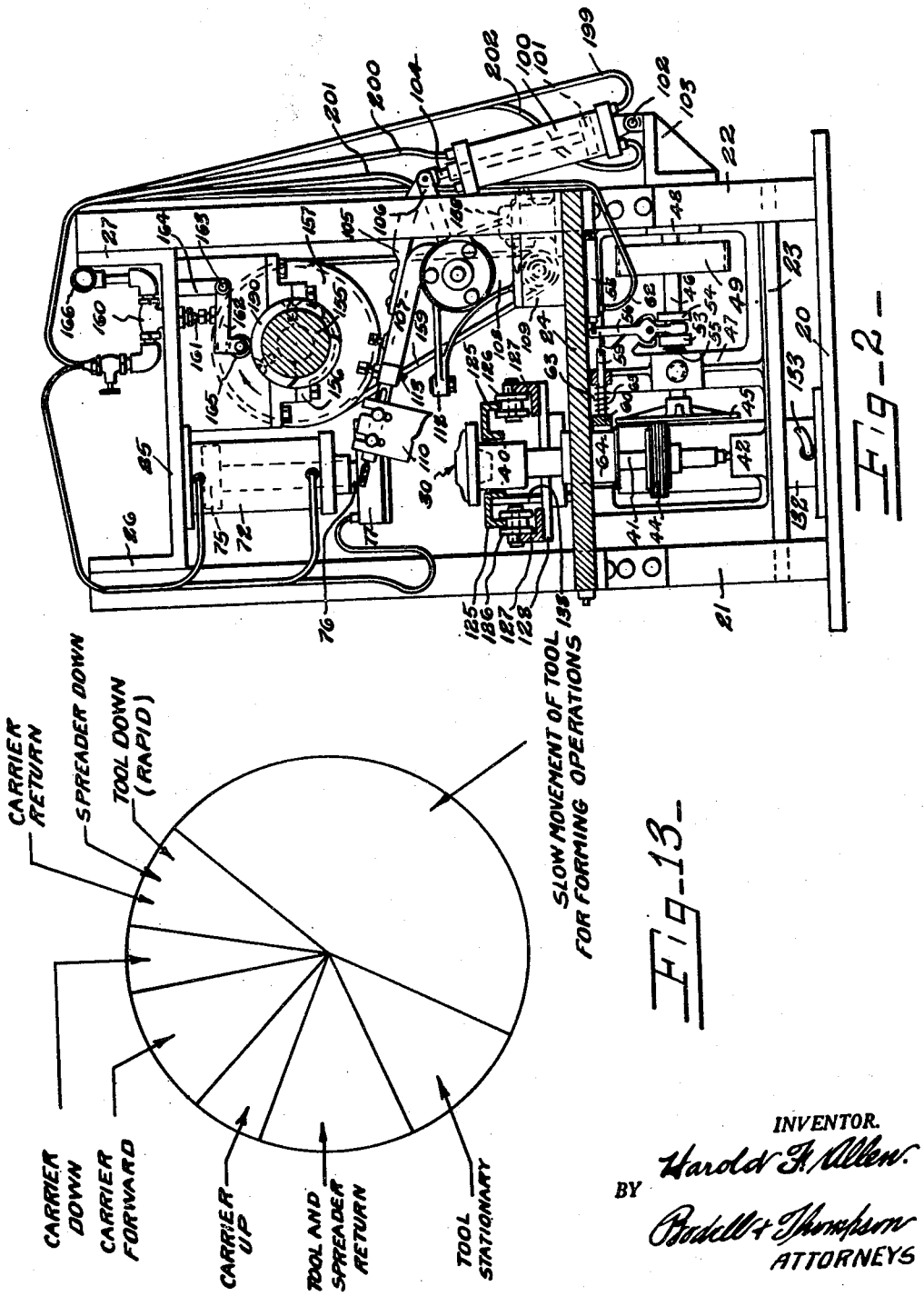

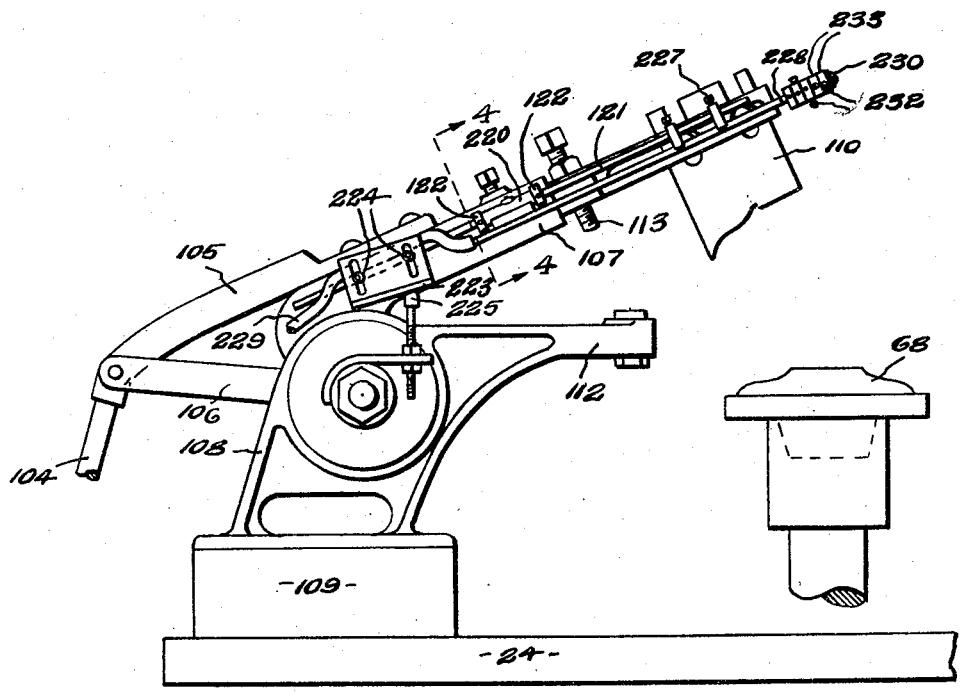
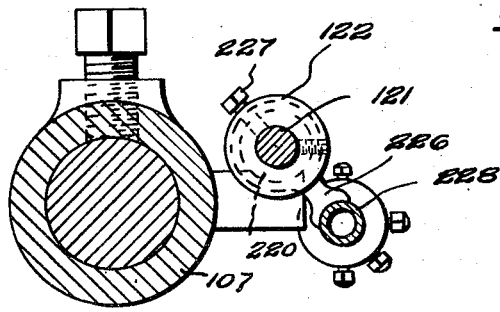
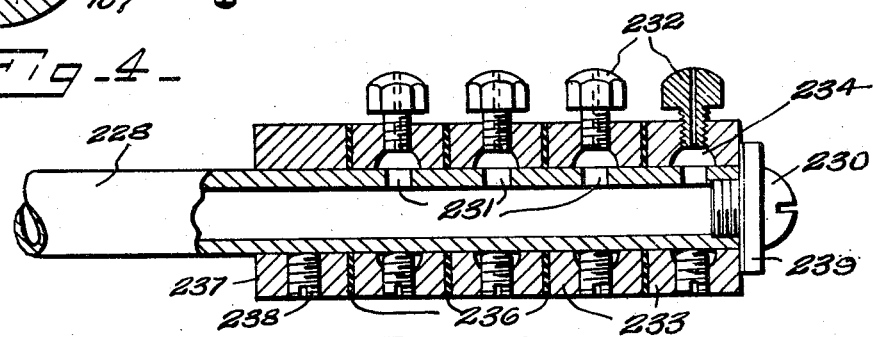

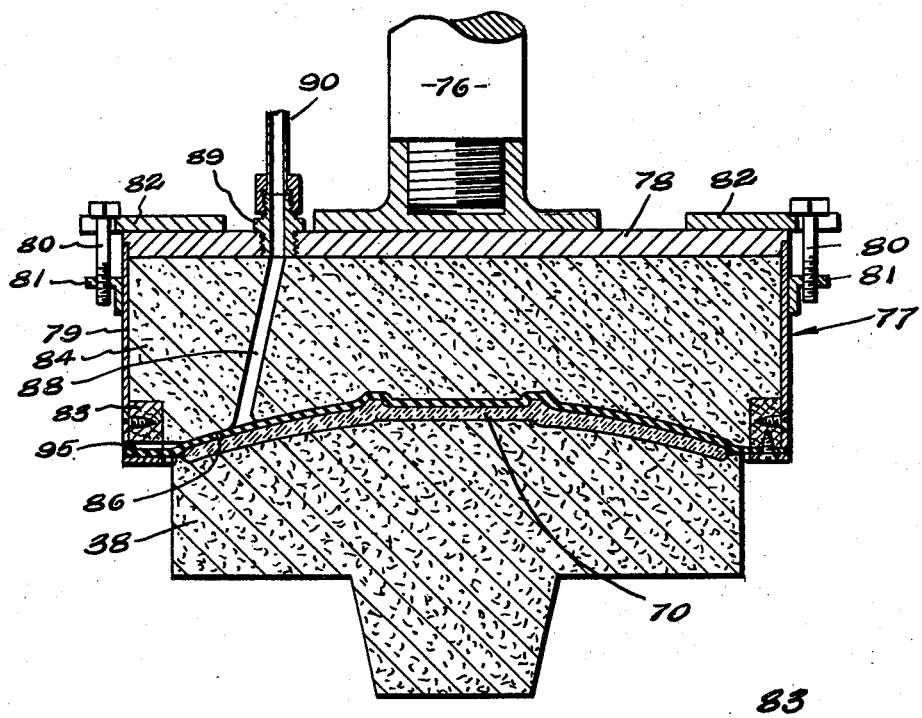
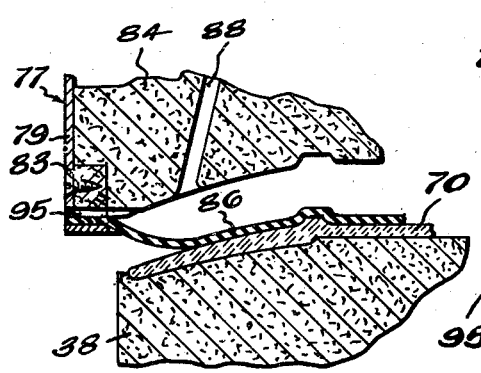

INVENTOR.
Harold F. Allen
BY
Bodell & Thompson
ATTORNEYS.

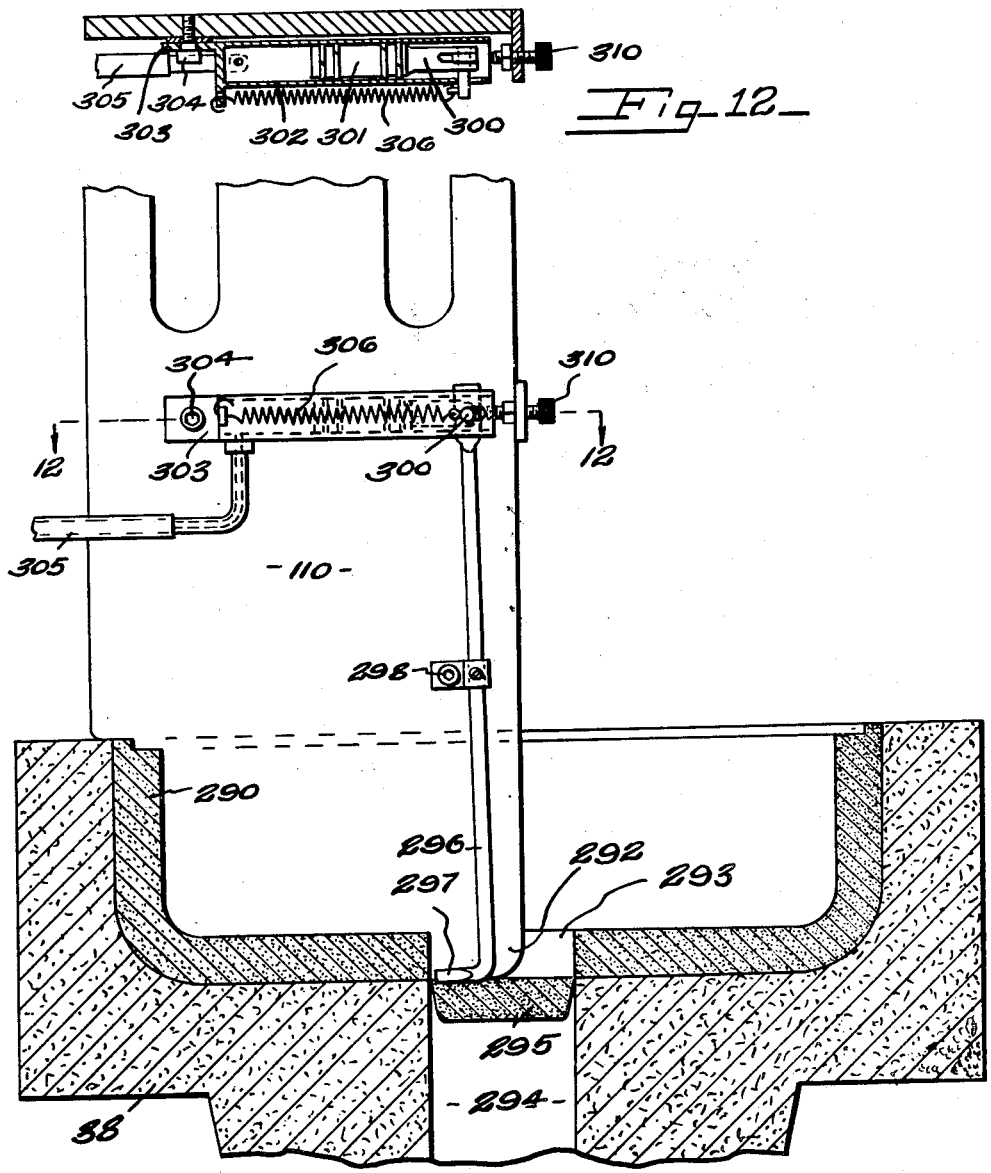

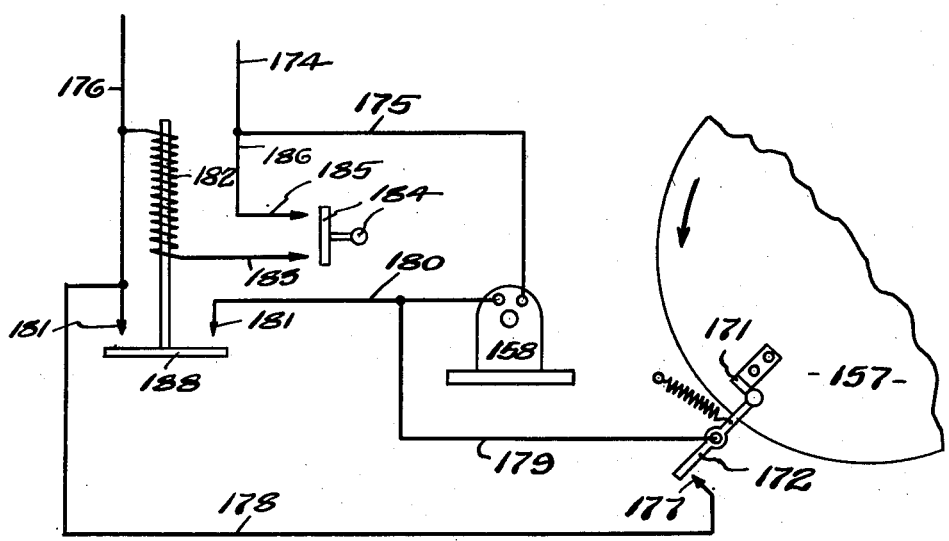
Fig-14-
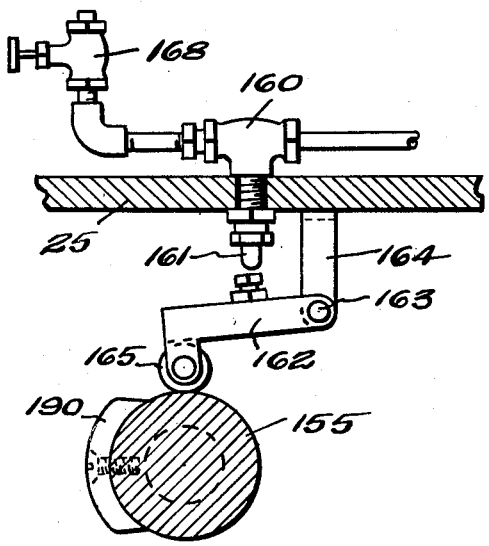
Fig-15-

Patented June 28, 1949

2,474,509

UNITED STATES PATENT OFFICE 2,474,509

JIGGERING MACHINE FOR FORMING ARTICLES OF PLASTIC CLAY

Harold F. Allen, De Witt, N. Y., assignor to Stewart F. Hancock, Syracuse, N. Y., as trustee Application May 29, 1944, Serial No. 537,814

9 Claims. (Cl. 25—24)

This invention relates to a machine for forming articles from plastic material, and more particularly for forming articles such as tableware, dishes, and the like, from plastic clay, the articles being formed in or in a mould by effecting relative between the mould, with the material therein or thereon, and a forming or profiling tool. This operation is commonly known in the pottery industry as jiggering.

Heretofore, the plastic material has been first formed into a sheet or disk somewhat resembling a pie-crust. The disk is then placed upon the mould by hand and thereupon the mould is rotated and the profiling tool is brought into contact with the material by hand operation. The mould is usually formed of plaster of Paris and forms one surface of the article, while the profiling tool forms the opposite side or surface of the article. In this manner flatware, such as plates, is produced.

Hollow ware, such as cups and bowls, is produced by forming the mould with a concavity into which a piece or ball of the material is placed manually, the mould rotated, and the profiling tool lowered into the mould, thus spreading the material around the inside of the mould. In this instance, the inner surface of the mould, of course, forms the outer surface of the article, and the profiling tool the inner surface of the article.

In the manufacture of flatware, considerable skill is required in forming the sheet or disk of plastic material and in properly placing it upon the mould. Inasmuch as the sheet or disk of material is without shape or contour or, in other words, is flat, it must be of sufficient thickness to allow for forming the proper contour by the profile tool. In regular operation this means that about forty percent of the material placed on the mould is scrapped.

In the case of forming the hollow ware, considerable pressure is required on the part of the operator to move the tool into the revolving mass of material in the mould. In practice, the material flows or works unevenly, with the result that the hand manipulated profile tool moves up and down relative to the mould, which action the operator attempts to overcome by exerting greater pressure on the tool. When the tool reaches the bottom of its movement, the clay has been reduced to a uniform thickness around the inside of the mould. However, in forming the flatware and the hollow ware, the initial uneven distribution of the material naturally places a greater strain on the material at certain points than at others, with the result that the material slips more or less relative to the mould, and this slipping causes marks to be made in the material adjacent the mould surface. These marks not only detract from the finished appearance of the article, but initiate cracks which subsequently develop in the firing of the article.

This invention has as an object, a machine of the type described embodying forming mechanism which is automatically power operated and which functions to quickly and efficiently form or jigger the article in such a manner that the finished article is of excellent grade, being equal to or better than that produced by the most skillful hand forming operation.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a machine embodying my invention.

Figure 2 is a view taken substantially on line 2—2, Figure 1.

Figure 3 is a side elevational view of the forming or jiggering mechanism per se, looking to the right, Figure 1.

Figure 4 is a view taken on line 4—4, Figure 3.

Figure 5 is a sectional view of the spray nozzle unit.

Figure 6 is a sectional view of the spreader head and a mould showing the material spread thereon.

Figure 7 is a fragmentary sectional view of the spreader head and mould, showing the head partially raised from the material on the mould.

Figure 8 is a bottom plan view of the spreader head with parts broken away.

Figure 11 is a side elevational view of the profiling tool showing mechanism for severing scrap material from the bottom of pieces of hollow ware.

Figure 12 is a view taken on line 12—12, Figure 11.

Figure 13 is a diagram showing the relative timing of the various operations of the machine.

Figure 14 is a schematic wiring diagram of the electrical circuit connected to the operating motor of the machine.

Figure 15 is a fragmentary view, partly in elevation and partly in section, of one of the cam actuated control valves and the actuating mechanism associated therewith.

Figure 9:
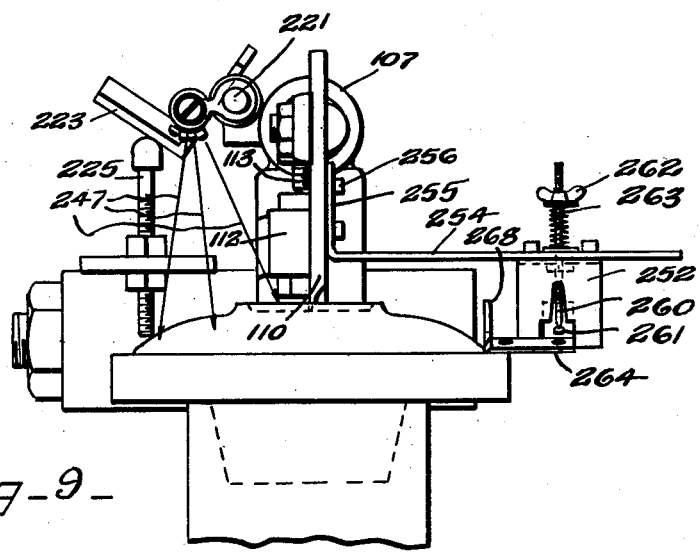
Figure 9 is a front elevational view of the jiggering mechanism.
Figure 10:
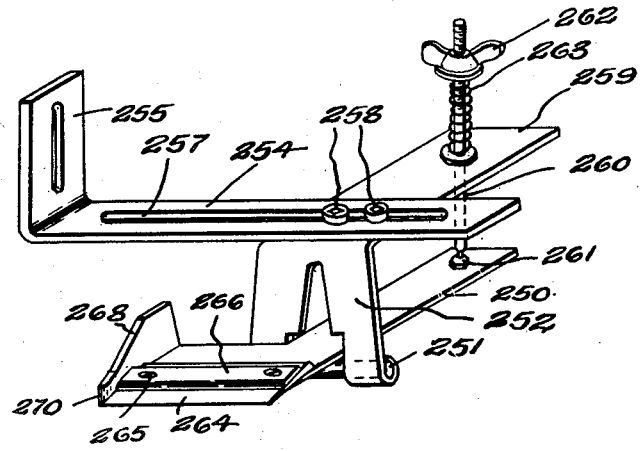
Figure 10 is a perspective view of the mechanism for trimming or removing scrap material from the edge of the article being jiggered.

As a whole, the machine consists of a frame on which is mounted four stations. At the first station, which I term a mould receiving station, the operator places a mould with the material thereon or therein. At the second station, which I term a spreading station the material, if the machine is producing flatware, is spread upon the mould. At the third station, which I term a forming station, the material carried by the mould is formed or profiled to proper contour, and at the fourth station, which I term the mould removal station, the operator removes the mould with the formed article thereon.

The machine further includes means for transferring the moulds from one station to the next, and means for operating the spreading and forming mechanisms in proper timed relation.

The machine consists of a suitable frame comprising a base plate 20, upright members 21, 22, and horizontal members 23, 24 and 25. The upper horizontal member 25 is of channel formation having side flanges 26, 27. Mould stations 28, 29, 30 and 31, are mounted upon the member 24. The stations 28, 29 and 30 consist of posts secured to the member 24 and being provided at their upper ends with mould receiving heads 32, 33, 34. The station 28, Figure 1, is designated as the mould receiving station. The heads 32, 33, 34 are formed to receive and support the moulds 38. The station 30 is the forming or jiggering station. At this station, the mould supporting head 40 is mounted upon the upper end of a spindle 41 journalled in its lower end in a bearing 42 mounted upon the lower cross member 23, and at its upper end in the cross member 24.

A friction pulley 44 is mounted upon the spindle 41 intermediate the bearings 42, 43, and is engaged by a driving disk 45 mounted upon the end of a shaft 46 journalled in a bracket 47 extending vertically between the cross members 23, 24, and at its opposite end in a member 48 secured to the uprights 22. A pulley 49 is fixed to the shaft 46. The shaft is rotated by a motor 50 through the instrumentality of a belt 51 trained over the pulley 49. The shaft 46 is movable axially to bring the driving disk 45 into and out of engagement with the friction pulley 44 by mechanism hereinafter described.

The shaft 46 is provided with fixed collars 53, 54. A helical compression spring 55 is interposed between the bracket 47 and the collar 53 and urges the shaft 46 to the right, Figure 2, maintaining the driving disk 45 out of engagement with the friction pulley 44. A lever 56 is pivotally mounted intermediate its ends to the bracket 47 and has a forked end positioned between the collars 53, 54, and having its opposite end connected to the plunger of an air cylinder 58. A rod 59 is slidable transversely in the upper portion of the bracket 57 and is provided at one end with a brake shoe 60 engaging a brake drum 64 mounted upon the spindle 41. The opposite end of the rod 59 is connected to the lever 56, and the rod is urged to the left, Figure 2, to bring the brake shoe 60 into engagement with the brake drum 64 by a spring 63 interposed between the brake shoe and the bracket.

The arrangement is such that when fluid is supplied to the cylinder 58 through tube 62, the lever 56 is actuated in a clockwise direction effecting axial movement of the shaft 46 to the left, Figure 2, to bring the driving disk 45 into engagement with the friction pulley 44 to effect rotation of the spindle 41 and simultaneously, to move the brake shoe 60 out of engagement with the drum 64. When the fluid is released from the cylinder 58, the spring 63 moves lever 56 in a counter-clockwise direction to disengage the drive to the spindle 41 and to apply the brake thereto.

In Figures 1 to 6, the tooling of the machine shown is for forming flatware, such as a plate 68. In forming ware of this type, it is desirable to properly spread the plastic material on the mould 38, this spreading being accomplished at the spreading station 29. The mould stations 28, 29, 30 and 31 are arranged along a path extending across the front of the machine. I designate the station 28, to the left Figure 1, as the mould receiving station, inasmuch as the operator places a mould 38 on the mould support 32 at this station, with a bat or piece of plastic material 70 positioned on the mould. The mould is subsequently moved to the spreading station 29 and thereafter to the forming station 30 and finally to the station 31 where the mould, with the formed article 68 thereon, is removed by the operator. In this machine, the moulds are placed in the machine and removed therefrom manually.

A cylinder 72 is mounted on the upper cross piece in axial alinement with the station 29, and in which is slidably mounted a piston 75 having a stem 76 depending through the lower end of the cylinder and to which is detachably secured a batter head 77. This batter head consists of a circular plate 78 threaded or otherwise detachably secured to the end of the stem 76. A metal shell 79 is detachably secured to the plate 78 by screws 80 threading into angle pieces 81 secured to the shell and extending through brackets 82 secured to the plate and having their overhanging portions bifurcated to receive the screws 80. An annular member 83 is secured in the shell 79 adjacent the lower edge thereof and which is conveniently formed of wood. The shell 79 is filled with material 84 which readily sets from the plastic state such, for example, as plaster-of-Paris, and a flexible diaphragm 86 is secured at its periphery to the member 83.

Initially, the shell 79, with the diaphragm 86 secured thereto, is positioned on a piece of formed ware positioned on the mould 38, whereupon the diaphragm takes substantially the contour of the back of the ware. The shell is then filled with plaster-of-Paris, which is permitted to set and thereafter, an aperture 88 is formed through the plaster-of-Paris and in register with a tube fitting 89 screwed into the plate 78 and attached to an air tube 90.

With this arrangement, when the mould with the material 70 thereon is positioned at station 29, air is applied to the cylinder 72 causing the batter head 77 to be lowered and moved into engagement with the material 70, spreading it upon the mould 38, as shown in Figure 6. Thereupon, air is applied in the lower end of the cylinder effecting upward movement of the batter head 77 and simultaneously, air is applied to the tube 90. The application of air through the aperture 88 is to hold the diaphragm 86 into engagement with the spread material, so that upon continued upward movement of the batter head, the peripheral portion of the diagram is first removed from the material, as shown in Figure 7, and thereafter the diaphragm is more or less peeled off from the material. This action is to gradually break the vacuum between the diaphragm and the spread material and thus prevent disturbance of the surface of the material in contact with the mould.

The function of the batter head is first to properly spread the material onto the top surface of the mould, whereby the contour of the mould is perfectly reproduced on the under side of the ware. That is, the side contacting the mould which, of course, is the top or upper side of the ware when it is in use. The second function of this spreader head is to approximately form the reverse side of the material, and the third function of the batter head is to accomplish the first and second functions mentioned without uneven stress on the material, particularly to preserve the contour obtained by the batter head pressing the material on the mould.

This batter head construction is an important feature of my invention in that it not only effects a smooth perfect surface of the material on the mould side, but effects a great saving in material because the reverse side of the material is formed substantially to shape, it being only necessary for the profiling tool at the jiggering station to remove just enough material to bring the surface to proper finished contour.

It will be understood by those familiar with this art that the usual method of arranging the material on the mould is for the operator to make a disk or pie-crust of the plastic material, and then place this manually on the mould. The formation of this pie-crust and the manipulation thereof to properly position it on the mould requires great skill which is acquired by the operator only after a period of years of experience. Attempts have been made heretofore to mechanically spread the material on the mould by only using a revolving blade-like element to roll or spread the material flatwise, or to descend with a flat batter head and press the material in a flatwise condition. Insofar as I am aware, the pre-forming of the material and doing so in the manner I have described, is novel.

The periphery of the spreader head is formed with small apertures 95 adjacent the lower edge thereof. These apertures extend inwardly through the surface of the material next to the edge of the diaphragm 86. The function of these apertures is to permit the escape of any air that may be trapped between the diaphragm and the material 84 as the spreader head descends into engagement with the material on the mould. The apertures are large enough to permit the escape of the trapped air, but not to interfere with the function of the air pressure through passage 86, as previously described.

After the material has been properly spread on the mould at the station 29, the mould is transferred to the station 30 where it is positioned in the head 40 on the upper end of the spindle 41. When the mould has been so transferred, air is applied to the cylinder 58 effecting engagement of the rotating driving disk 45 with the friction pulley 44 and accordingly effecting rotation of the mould with the material thereon. Air is also supplied to the bottom of the cylinder 100 causing the piston 101 therein to move upwardly. The cylinder is pivotally mounted at its lower end at 102 to a bracket 103 secured to the rear of the frame, and the upper end of the piston rod 104 is pivotally connected to rearwardly extending projections 105, 106, of an arm 107, see Figure 3. The arm 107 is journalled in a bracket 108 mounted upon a block 109 supported by the frame member 24.

A profiling tool 110 is adjustably secured to the outer end of the arm 107 and as the arm 107 is rotated in a counter-clockwise direction Figure 2, the tool 110 is brought into contact with the material on the mould and, in view of the fact that the mould is at that time revolving, the surface of the material is brought to the proper contour by the tool 110. The bracket 108 is formed with a forwardly extending portion 112, and the arm 107 is provided with an adjustable stop in the nature of screw 113 which coacts with the arm 112 and by which the lowermost position of the arm and tool 110 may be determined.

It is understood the profile tool 110 is shaped to produce the desired contour of the piece of ware being formed and that it is adjustable vertically and laterally, as is conventional in forming jiggering tools.

When the forming operation has been completed, air is supplied to the upper end of the cylinder 100 causing the piston 101 to move downwardly and the tool 110 to move upwardly in the positions shown in Figures 1 and 2, and thereupon the air supply is cut off to the cylinder 58 effecting disengagement of the drive to the spindle 41 and the application of the brake shoe 60 to the drum 61. Thereafter, the mould with the formed ware thereon is transferred to the station 31 from whence it may be removed by the operator.

The moulds 38 are transferred from station to station by a mould carrier which is movable vertically and is reciprocated laterally in a direction parallel to the path in which the mould stations are arranged. The carrier consists of a pair of spaced apart rails 125 positioned on rollers 126 journalled on supporting rails 127. The rails 127 are shorter than the rails 125 and there are a plurality of pairs of rollers 126. The supporting rails 127 are mounted intermediate their ends to a plate 128 which, in turn, is mounted upon the upper end of a piston rod 130 and which is secured at its lower end to a piston 131 mounted in a cylinder 132. With this arrangement, when air is supplied to the bottom of the cylinder through conduit 133, the rails 127, 125, are elevated and this movement is such as to vertically move the moulds out of the heads 32, 33, 40, 34.

A bar 138 is secured to one of the rails 125 and depends downwardly, see Figure 1. A cylinder 139 is pivotally mounted at one end to a bracket 140 secured to the frame member 24. A piston 141 is mounted in the cylinder and the piston rod 142 is pivotally connected to the lower end of the arm 138. The carrier is normally in the position shown in Figure 1. When air is supplied to the elevating cylinder 132, the carrier is moved vertically engaging the moulds 38 at each station and moving them clear of their respective mould supports. Thereupon air is applied to the cylinder 139, moving the piston to the right Figure 1 and accordingly, moving the carrier in the same direction. This movement is such as to advance the moulds one station, as indicated by dotted outline 145, the forward end of the carrier engaging a stop 146 secured to the right hand end of the frame of the machine.

When the carrier has thus been advanced, air is released from the cylinder 132 permitting the carrier to move downwardly and position the moulds on the mould supports. Air is then applied at the opposite end of the cylinder 139 and its carrier returned to its initial position.

The fluid pressure to the cylinders 58, 72, 100, 132, 139, is controlled by a series of valves 160 mounted upon the upper cross member 25. These valves are actuated in predetermined time relation by a series of cams 190 mounted upon a cam shaft 155 journalled at each end in bearing members 156 depending from the under side of the cross member 25. The shaft extends through one of the bearings, and a pulley wheel 157 is mounted upon the extended end of the shaft and is operatively connected to a motor drive 158 through belt 159.

The valves 160 are provided with stems 161. The valves are normally closed and are opened when the stems are pushed inwardly. Each valve has associated with it a cam follower 162 pivoted at 163 to a bracket 164 depending from the upper cross piece 125. The free end of the followers 162 is provided with a roller 165 engaging the associated cam. Fluid, such as compressed air, is supplied to the machine through a main conduit or header 166 and to which certain of the valves 160 are connected.

Each of the actuating cylinders is provided with a bleeding or exhaust port as well as an intake port, and the cylinders 72, 100 and 139 are provided with intake and exhaust ports at both ends to make the cylinders of the double acting type. The exhaust port of each cylinder is connected to one of the valves 160, in which event one side of the valve 160 is connected to the exhaust port of the cylinder, and the opposite side is connected to atmosphere through a regulating valve 168 preferably of the needle type, or otherwise being capable of close adjustment.

The cam shaft pulley wheel 157 is provided with a projection 171 arrange to engage a limit switch 172 suitably mounted upon the frame of the machine. The purpose of this switch is to permit the machine to be operated through a complete cycle by a single actuation on the part of the operator. This operation may be brought about by any conventional circuit, such as the one shown in Figure 14, wherein one of the lead conductors 174 is connected to the motor 158 by wire 175, and the other lead 176 is connected to contact 177 of limit switch 172 by wire 178. The movable contact of the switch 172 is connected to the other side of the motor through wires 179, 180, and also to a contact 181 of a relay, the coil 182 of which is connected to the lead 176, and the opposite side to a contact 183 of a push button switch 184 conveniently located on the machine. Contact 185 of the push button is connected to the other lead 174 through wire 186. Contact 187 of the relay is connected to the lead 176.

With this arrangement, when the operator actuates the push button 184, a circuit is completed through the coil 182 of the relay, moving the armature 188 thereof to bridge the contacts 181, 187. This completes the motor circuit through the contacts of the relay and wire 180, whereupon the motor effects rotation of pulley 157 and the cam shaft and whereupon the projection 171 over-runs the switch 172 permitting it to engage the contact 177. Thereafter, the feed is furnished to the motor through wire 178, over-run switch, wires 179, 180. When the cam shaft has made one revolution, the projection 171 again engages the limit switch 172 separating its contacts and accordingly opening the circuit to the motor.

The cams designated generally 190 are so positioned on the shaft 155 and are of such length as to cause the various movements of the machine to be effected in a predetermined timed sequence. The total period necessary to permit the various operations to be performed depends somewhat on the particular piece of ware or article being formed. This period is generally about six seconds.

The machine is shown in the starting position in Figure 1. When the operator closes the push button switch 184, certain of the cams 190 open certain of the valves 160 to simultaneously apply fluid pressure to the cylinder 58, the top of the cylinder 72, and the bottom of the cylinder 100. As previously explained, application of pressure to cylinder 58 engages the driving mechanism to effect rotation of the spindle 41. Simultaneously with the application of pressure to these cylinders, the exhaust ports of the cylinders 72, 100, are opened, whereby the spreader head 77 and the forming tool 110 descend toward the moulds. The conduits 195, 196, may be considered connected to the intake ports of the cylinder 72, and the conduits 197, 198, connected to the exhaust ports of the cylinder and likewise, the conduits 199, 200, as being connected to the intake ports of cylinder 100, and conduits 201, 202, connected to the exhaust ports of the cylinder. Accordingly, at the beginning of the cycle the conduits 195, 199, are connected to the header 166, and the conduits 198, 201, are connected to atmosphere through the bleeding valves 168.

The valve connected to the conduit 198 is adjusted to permit rapid exhaustion of the cylinder to effect rapid downward movement of the spreader head 77. This rapid movement of the head produces an effective blow on the material positioned on the mould to cause the same to be properly spread on the mould. Also, it permits this spreading operation to take place prior to the engagement of the forming tool 110 with the material at the forming station, whereby the jar occasioned by the spreader head striking the material on the mould has taken place previously and does not adversely affect the forming operation.

The exhaust conduit 201 is connected to a bleeder valve 168 which is so adjusted as to effect a relatively rapid downward movement of the forming tool 110 from its up position, as shown in Figure 2, to a position where it is about to contact the material on the mould. When the tool has reached this position, the conduit 200 is connected to the header 166 through a conventional reducing valve not shown. The effect of this arrangement is to build up back pressure on the piston 101, whereby the remainder of its movement is at a relatively slow rate. The most advantageous rate at which the tool moves during the actual forming operation depends upon a number of factors, such as the material being used, the condition of the material, and the particular contour, size and shape of the piece being formed. With the arrangement described, this movement can be controlled to a very close and exacting degree. Furthermore, the tool does not move into the material at a speed greater than the predetermined speed determined by the pressure maintained on the top side of the piston 101. This prevents the tool from jumping ahead after it has yielded upon the engagement of a hard spot in the clay, and is an important feature in producing high class ware.

When the forming operation has been completed, the exhaust port in the lower end of the cylinder 100 is connected through the conduit 202 to a bleeder valve 168. This causes a material drop in the pressure on the under side of the piston 101, the pressure being slightly less than the pressure at the upper side of the piston, whereupon the piston 101 starts to descend slowly and accordingly, to slowly raise the forming tool 110 from engagement with the finished article. Thereafter, conduit 199 is closed off from the header 166, and conduit 201 is closed off from its associated bleeder valve, whereupon the application of pressure through the conduit 200 causes a rapid ascent of the forming tool to its upward position and simultaneously, with this operation, conduit 198 is closed off from atmosphere—conduit 197 is connected to atmosphere—conduit 195 closed off from header 166, and conduit 196 connected to the header, and conduit 90 is momentarily connected to the header, whereby the spreader head 77 is raised to its up position and, at this time, pressure is cut off from cylinder 58 and the exhaust port thereof connected to atmosphere, whereby the drive to the forming spindle 41 is disconnected and the brake 60 applied.

Thereupon, certain of the cams 190 effect operation of other of the valves 160 to apply pressure to the lower end of the elevating cylinder 132 through conduit 133, causing the carrier 125 to move upwardly and remove all of the moulds from the supports 32, 33, 34 and 40. Thereupon air is applied to the cylinder 139 through conduit 208, the exhaust port at the opposite end of the cylinder being connected to atmosphere through conduit 209. This causes the piston in cylinder 139 to move outwardly, and to move the carrier 125 to move the moulds one station in advance. Pressure to the conduit 133 is then cut off and exhaust conduit 210 is connected to atmosphere, permitting the piston 131 and carrier 125 to return to normal position. Thereupon, pressure to conduit 208 is cut off and pressure applied to conduit 212. Simultaneously, conduit 209 is closed to atmosphere, and conduit 213 is connected to atmosphere to effect lateral return movement of the carrier 125. Upon this return, the projection 171 has opened the contacts of limit switch 172, and the machine stops.

During the forming operation, the operator removes the mould, with the finished article thereon, from the mould removal station 31 and places a new mould with a bat of material thereon on the mould support 32 at the mould receiving station 28. It will be apparent that with this arrangement the operator's duties are only to remove the mould with the finished ware thereon and to place a mould with a bat of material on it in the machine. Accordingly, the operator does not have to be skilled in the art of spreading or jiggering the material. On the other hand, the machine effects uniform spreading and uniform jiggering of the material, both of these operations being accurately adjusted for the particular job, whereby the finished ware is fully equal or better than that produced by hand operations and with an operator turning out materially increased production. The sequence and relative time of the various operations is set forth in the diagrammatic chart shown in Figure 13.

In jiggering or forming articles from certain plastic materials, particularly clay, it has been found most advantageous to do the forming in the presence of moisture, usually the operation being best performed by increasing the moisture beyond that which the material normally contains. In conventional hand jiggering, this additional moisture is supplied by the operator applying a moistened sponge to the material during the jiggering or forming operation. As in other phases of this art, the operators become more or less skilled in the application of water to the ware while being formed. However, it is quite obvious that the application of moisture is not controlled with any exacting degree and, in fact, varies considerably.

This invention also includes mechanism for supplying such additional moisture during the forming operation, whereby the moisture is supplied at a predetermined time at a predetermined location, which is varied as the forming operation proceeds, and is supplied to a predetermined amount—all of these factors being within close control.

The pivoted tool supporting arm 107 is formed with a laterally extending bearing bracket 220 in which a shaft 221 is journalled and which extends forwardly terminating in juxtaposition to the tool 110 and rearwardly in juxtaposition to the axis of the pivot for the arm 107, the shaft being held from endwise movement by collars 222. An angle member 223 is adjustably secured to the shaft 221 as by screws 224, the angle member being positioned to engage an adjustable stop 225 mounted on a fixed portion of the machine. A bracket 226 is adjustably secured to the forward end of the shaft 221 as by set screws 227, and a pipe 228 is secured to the bracket 226 and extends rearwardly and is connected to a flexible conduit or hose 229. The forward end of the pipe 228 extends slightly beyond the forming tool 110 and is threaded internally to receive a screw 230 and is formed with apertures 231 spaced axially. A plurality of nozzles 232 are mounted upon the pipe 228, the nozzles being threaded into disks 233, the opening in the nozzles communicating with an internal annular groove 234, whereby the nozzles are rotatably adjustable on the pipe 228 and are always in communication with the interior of pipe 228. The disks 233 are separated by suitable watertight gaskets 236 and are retained from axial movement by a collar 237 secured to the pipe as by set screw 238, and the disks 233 are tightly compressed against the gaskets 236 and thus maintained in adjusted position by a washer 239 cooperating with the screw 230. This arrangement is such that the nozzles may be adjusted lengthwise of the arm 107, and the nozzles may also be individually adjustable about the tube 228 so as to direct the water ejected therefrom to the desired points on the material. The nozzles are initially adjusted so that one of them discharges fluid at a point adjacent the center of the material on the mould. Another, at a point some distance from the periphery of the material on the mould and a third, at a point in between.

The discharge of the nozzles is also controlled by one of the cams 190 which supplies pressure to conduit 243 to a diaphragm operated valve 244 connected to a water pipe feed 245. Application of pressure to the conduit 243 causes the valve 244 to open and its discharge is connected to the tube 229.

In forming flat ware on the moulds, the arrangement of the cam 190 is such that water is supplied to the nozzles just previous to the engagement of the tool with the material on the mould. Upon this engagement, one leg of the angle piece 223 engages the stop 225 and thereby causes a rotation of shaft 221 about its axis and likewise, a movement of the nozzles 232 about such axis. This causes the jets from the nozzles to move radially outwardly on the material during the forming operation, the final position of the nozzles being shown by lines 247, Figure 9.

In forming hollow ware within the mould, the water control cam 190 is arranged to effect opening of the valve 244 after the forming tool has descended far enough to more or less spread the material around the inside of the mould, thus directing the sprays on the material and in applying any excessive moisture directly to the mould.

It is not possible in jiggering operations to measure the amount of material required to make the piece without having any scrap material. In other words, the quantity of material on or in the mould at the jiggering station is always more or less in excess of what is actually required to make the article. In making flatware, this excess material gathers on the periphery of the piece and is removed by the operator holding a thin piece of metal on the edge of the ware at the conclusion of the jiggering operation. This requires additional time and effort on the part of the operator, and requires considerable skill so as not to distort or otherwise damage the edge of the ware. This invention contemplates a scrapping device which is attached to the profiling tool and which functions to automatically remove the scrap material.

This device consists of a flat member 250 pivotally mounted between its ends as at 251 to a bifurcated bracket 252 mounted upon a laterally extending support 254 having an upwardly extending portion 255 adjustably secured to the profiling tool 110, as by screws 256. The support member 254 is formed with an elongated slot 257 to receive clamping screws 258 which adjustably secure the bracket 252 to the support member. The bracket 252 has a rearwardly extending portion 259 apertured to receive a bolt 260, the lower end of which is pivotally connected to the flat member 250 at 261. The upper end of the bolt is threaded to receive an adjusting nut 262, and a helical compression spring 263 is interposed between the nut and the portion 259 of the bracket, all whereby the forward end of the flat member 250 is yieldingly urged downwardly. A blade 264 is secured to the forward end of the flat member by screws 265 which also hold in place a rib 266. The flat member is formed at its forward end, on the side toward the center of the mould, with an upstanding flange 268, the forward portion of which terminates in a beveled blade 270.

The device is mounted upon the forming tool 110 and is adjusted relatively thereto so that the blade 264 will engage the peripheral marginal top surface of the mould, and the blade 270 will engage the peripheral edge of the piece being formed. The engagement of the blade 264 with the marginal portion of the mould is under slight pressure of spring 226, whereupon the blade 264 is readily permitted to follow the surface contour of that portion of the mould with which it is in engagement without in any way causing damage thereto. The purpose of the rib 266 is to direct the flow of scrap material upwardly at a relatively sharp angle, whereby it is projected entirely over the forward portion of the flat member 250, thus preventing any accumulation of scrap material on the blade.

I have found that this scrapping device functions very efficiently and accurately trims the ware and removes all excess material from the mould. It functions entirely automatically during the latter part of the forming operation.

In Figure 11, a piece of hollow ware 290 is being formed. This piece of ware is in the nature of a bowl and the profiling tool is formed with a depending portion 292 effective to form a hole or aperture 293 in the center of the bottom wall of the bowl. The mould 38 is formed with a central passage 294 into which the material is forced from the aperture 293, as indicated at 295. This operation sometimes leaves a fringe of material around the inside of the hole 293 adjacent the lower end thereof, and means is provided for automatically trimming this bottom edge of the hole. This means consists of a trimming tool 296 having an offset blade portion 297. The tool 296 is pivotally mounted intermediate its ends to the forming tool 110, as at 298. The upper end of the tool is connected to a piston rod 300 having a piston 301 positioned in a cylinder 302 carried by a bracket 303 secured to the forming tool as by screw 304. The piston is moved to the right, Figure 11, by the admission of air through the pipe 305, and is moved to the left by the compression spring 306. The blade portion 297 of the tool is arranged in the aperture 293 of the article being formed and in juxtaposition to the lower edge thereof. At the completion of the forming operation, air is supplied to the pipe 305 by one of the valves 160 being operated by one of the cams 190. This causes the blade portion 270 to move into engagement with the wall of the recess 293 and, inasmuch as the mould is rotating, effectively trims off any fringe or collection of material around the bottom edge of the aperture. The waste material, in the nature of the plug 295, passes downwardly through the hole 394 in the mould. The movement of the blade 297 toward the wall of the aperture is controlled by an adjustable stop 310 carried by the forming tool 110. Upon completion of the trimming operation, the valve 160 is closed and the pipe 305 connected to one of the exhaust valves 168.

Figure 13 illustrates diagrammatically the sequence of operations while the machine is passing through a complete cycle which is in the neighborhood of six seconds, although it will be apparent that the cycle will vary somewhat depending upon the size and shape of the article being formed, the material being used, etc. Experience has shown that the machine described operates very efficiently and not only produces a much greater volume of ware per operator than is produced by the hand method or by any machine methods heretofore used, but also produces ware of an excellent grade.

What I claim is:

1. A machine for forming articles of plastic material comprising a suitable frame, a spindle journalled in the frame and adapted to support a mould with plastic material thereon, a forming tool mounted on the frame in juxtaposition to said spindle and being movable from an initial position above a mould mounted on the spindle toward and from the mould and into engagement with the plastic material thereon to form the same, a power drive operable when connected to said spindle to effect rotation thereof, a clutch means for connecting and disconnecting said power drive, a fluid operated motor connected to said tool, valve means for connecting said motor to a fluid supply, valve operating means operable through a cycle to effect movement of said valve means in a predetermined timed sequence to cause said motor to move said forming tool from its initial position toward the mould, and into engagement with the material thereon and, upon completion of the forming operation, to return said tool to its initial position, a clutch actuating means operable by said valve operating means to effect engagement of said spindle clutch means during the forming operation, and manually controlled regulating means for varying the movement of the forming tool by the motor, and for varying the engagement of said clutch means during said cycle.

2. A machine for automatically forming articles of plastic material comprising a frame, a spindle journalled in the frame and adapted to support a mould with plastic material thereon, a power drive operable when connected to said spindle to effect rotation thereof, a forming tool mounted on the frame in juxtaposition to said spindle and being movable from an initial position above the mould mounted upon said spindle toward and from the mould and into engagement with the plastic material thereon, a spindle brake operable when engaged to stop rotation of the spindle, a spindle clutch means operable upon engagement to connect said power drive to the spindle, a fluid operated actuating means operable to effect engagement and disengagement of said brake and clutch means, a fluid operated motor connected to said tool, valve means for connecting said fluid operated motor and said fluid operated actuating means to a fluid supply, valve operating means operable through a cycle to effect movement of said valve means in a predetermined timed sequence, to cause said fluid operated motor to move said forming tool from its initial position toward the mould, and into engagement with the material thereon and, upon completion of the forming operation, to return said tool to its initial position, said valve means being also operable to cause said fluid operated actuating means to disengage said brake and engage said clutch means during the forming operation and upon completion thereof to disengage said clutch means and engage said brake means, and manually controlled fluid regulating means for varying the movement of the forming tool by the fluid operated motor and the engagement and disengagement of said clutch and brake means during said cycle.

3. A machine for forming articles of plastic material comprising a frame, a spindle journalled in the frame and adapted to support a mould with plastic material thereon, a forming tool mounted on the frame in juxtaposition to said spindle and being movable from initial position above a mould mounted on the spindle toward and from said mould and into engagement with the plastic material thereon, a reversible fluid operated motor comprising a cylinder, a piston movable in the cylinder and operatively connected to said forming tool, a source of compressible fluid under pressure, valve means operable through a predetermined cycle to apply fluid to one side of the piston to effect movement of the tool rapidly from said initial position towards the material thereon, and thereupon to simultaneously apply fluid at reduced pressure to the opposite side of the piston to retard movement of the tool during the forming operation and upon completion of the forming operation to cease the application of fluid to said one side of the piston to effect return movement of the tool by said application on the opposite side of the piston, and manually operable control means adjustable to vary the extent of the rapid movement of the tool.

4. A machine for forming articles of plastic material comprising a frame, a spindle journalled in the frame and adapted to support a mould with plastic material thereon, a forming tool mounted on the frame in juxtaposition to said spindle and being movable from initial position above a mould mounted on the spindle toward and from said mould and into engagement with the plastic material thereon, a reversible fluid operated motor comprising a cylinder, a piston movable in the cylinder and operatively connected to said forming tool, a source of compressible fluid under pressure, valve means operable through a predetermined cycle to apply fluid to one side of the piston to effect movement of the tool rapidly from said initial position towards said mould into a position adjacent the material thereon, and thereupon to simultaneously apply fluid at reduced pressure to the opposite side of the piston to retard movement of the tool during the forming operation and upon completion of the forming operation to cease the application of fluid to said one side of the piston to effect return movement of the tool by said application on the opposite side of the piston, and manually operable control means adjustable to vary the speed of the tool during the rapid movement thereof independently of the speed of the tool during the retarded movement thereof.

5. A machine for forming articles of plastic material comprising a frame, a spindle journalled in the frame and adapted to support a mould with plastic material thereon, a forming tool mounted on the frame in juxtaposition to said spindle and being movable from initial position above a mould mounted on the spindle toward and from said mould and into engagement with the plastic material thereon, a reversible fluid operated motor comprising a cylinder, a piston movable in the cylinder and operatively connected to said forming tool, a source of compressible fluid under pressure, valve means operable through a predetermined cycle to apply fluid to one side of the piston to effect movement of the tool rapidly from said initial position towards said mould into a position adjacent the material thereon, and thereupon to simultaneously apply fluid at reduced pressure to the opposite side of the piston to retard movement of the tool during the forming operation and upon completion of the forming operation to cease the application of fluid to said one side of the piston to effect return movement of the tool by said application on the opposite side of the piston, and manually operable control means adjustable to vary the speed of the tool during the retarded movement thereof independently of the speed of the tool during the initial movement thereof.

6. A machine for forming articles of plastic material comprising a frame, a spindle journalled in the frame and adapted to support a mould with plastic material thereon, a forming tool mounted on the frame in juxtaposition to said spindle and being movable from initial position above a mould mounted on the spindle toward and from said mould and into engagement with the plastic material thereon, a reversible fluid operated motor comprising a cylinder, a piston movable in the cylinder and operatively connected to said forming tool, a source of compressible fluid under pressure, valve means operable through a predetermined cycle to apply fluid to one side of the piston to effect movement of the tool rapidly from said initial position towards said mould into a position adjacent the material thereon, and thereupon to simultaneously apply fluid at reduced pressure to the opposite side of the piston to retard movement of the tool during the forming operation and upon completion of the forming operation to cease the application of fluid to said one side of the piston to effect return movement of the tool by said application on the opposite side of the piston, and manually controlled fluid regulating means for varying the speed of the movement of the tool in different portions of said cycle.

7. A machine for forming articles of plastic material comprising a suitable frame, a spindle journalled in the frame and adapted to support a mould with plastic material thereon, a forming tool mounted on the frame in juxtaposition to said spindle and being movable from an initial position above a mould mounted on the spindle toward and from the mould and into engagement with the plastic material thereon to form the same, a power drive operable when connected to said spindle to effect rotation thereof, a clutch means for connecting and disconnecting said power drive, a fluid operated motor connected to said tool, valve means for connecting said motor to a fluid supply, valve operating means operable through a cycle to effect movement of said valve means in a predetermined timed sequence to cause said motor to move said forming tool from its initial position toward the mould, and into engagement with the material thereon and, upon completion of the forming operation, to return said tool to its initial position, a clutch actuating means operable by said valve operating means to effect engagement of said spindle clutch means during the forming operation, and manually controlled regulating means for varying the movement of the forming tool by the motor during said cycle.

8. A machine for automatically forming articles of plastic material comprising a frame, a spindle journalled in the frame and adapted to support a mould with plastic material thereon, a power drive operable when connected to said spindle to effect rotation thereof, a forming tool mounted on the frame in juxtaposition to said spindle and being movable from an initial position above the mould mounted upon said spindle toward and from the mould and into engagement with the plastic material thereon, a spindle brake operable when engaged to stop rotation of the spindle, a spindle clutch means operable upon engagement to connect said power drive to the spindle, a fluid operated actuating means operable to effect engagement and disengagement of said brake and clutch means, a fluid operated motor connected to said tool, valve means for connecting said fluid operated motor and said fluid operated actuating means to a fluid supply, valve operating means operable through a cycle to effect movement of said valve means in a predetermined timed sequence, to cause said fluid operated motor to move said forming tool from its initial position toward the mould, and into engagement with the material thereon and, upon completion of the forming operation, to return said tool to its initial position, said valve means being also operable to cause said fluid operated actuating means to disengage said brake and engage said clutch means during the forming operation and upon completion thereof to disengage said clutch means and engage said brake means, and manually controlled fluid regulating means for varying the movement of the forming tool by the fluid operated motor during said cycle.

9. A machine for forming articles of plastic material comprising a frame, a spindle journalled in the frame and adapted to support a mould with plastic material thereon, a forming tool mounted on the frame in juxtaposition to said spindle and being movable from initial position above a mould mounted on the spindle toward and from said mould and into engagement with the plastic material thereon, a reversible fluid operated motor comprising a cylinder, a piston movable in the cylinder and operatively connected to said forming tool, a source of compressible fluid under pressure, valve means operable through a predetermined cycle to apply fluid to one side of the piston to effect movement of the tool rapidly from said initial position towards said mould into a position adjacent the material thereon, then into engagement with the material to form the same and upon completion of the forming operation to cease application of fluid to said one side of the piston and apply fluid to the opposite side of the piston to effect return movement of the tool by said application on the opposite side of the piston, fluid operated means operable in opposition to the movement of the tool during the forming operation to limit the speed of the tool movement by the application of fluid on said first side of the piston during the forming operation, and manually operable control means adjustable to vary the extent of the rapid movement of the tool.

HAROLD F. ALLEN.

REFERENCES CITED

The following references are of record in the file of this patent:

UNITED STATES PATENTS

| Number | Name | Date |
|---|---|---|
| 1,750,762 | Miller | Mar. 18, 1930 |
| 1,762,387 | Dengler | June 10, 1930 |
| 1,809,794 | Stenhouse | June 9, 1931 |
| 2,030,804 | Tucker et al. | Feb. 11, 1936 |
| 2,046,525 | Miller | July 7, 1936 |
| 2,293,070 | Miller et al. | Aug. 18, 1942 |
| 2,321,471 | Emerson | June 8, 1943 |
| 2,409,172 | Miller | Oct. 8, 1946 |